March 9, 1937.                J. H. DORAN                 2,073,514
         METHOD OF ASSEMBLING PACKING RINGS IN SOLID TURBINE ROTORS
                          Filed Jan. 2, 1936
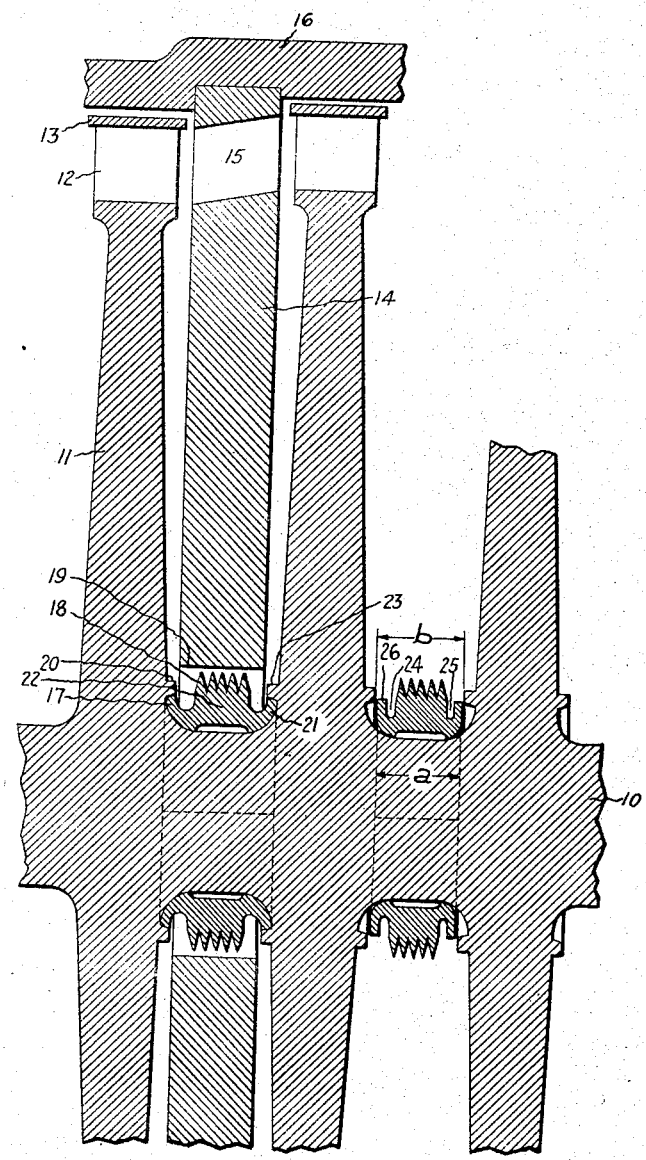
Inventor:
John H. Doran,
by Harry E. Dunham
His Attorney Patented Mar. 9, 1937

2,073,514

UNITED STATES PATENT OFFICE 2,073,514

METHOD OF ASSEMBLING PACKING RINGS IN SOLID TURBINE ROTORS

John H. Doran, Scotia, N. Y., assignor to General Electric Company, a corporation of New York Application January 2, 1936, Serial No. 57,083

1 Claim. (Cl. 29—156.8)

The present invention relates to methods of assembling packing rings in solid type turbine rotors, that is, rotors in which a plurality of bucket wheels are integrally formed with a shaft.

The general object of my invention is to provide an improved arrangement and method of assembling packing rings in such solid type turbine rotors.

For a consideration of what I believe to be novel and my invention, attention is directed to the following description and the claim appended thereto in connection with the accompanying drawing.

The single figure of the drawing illustrates a sectional view partly broken away of an elastic fluid turbine embodying my invention.

The turbine comprises a solid rotor having a shaft 10 and a plurality of wheels 11 integrally formed with the shaft 10. Each wheel carries a row of buckets 12 fastened thereto in any suitable manner and having outer ends held in position and united by means of shroud bands or rings 13. A diaphragm 14 having partitions or blades 15 is interposed between adjacent bucket wheels for conducting and properly directing the flow of fluid from a higher stage to a lower stage. The diaphragms are split in halves and supported by an outer casing 16. In order to reduce leakage along the shaft through the spaces defined between adjacent surfaces of the bucket wheels and the diaphragms, an interstage packing is provided between the inner surface of each diaphragm and the adjacent shaft portion. The packing includes a ring 17 in the form of a plurality of segments having an outer surface defining a plurality of teeth 18 adjacent a cylindrical packing surface 19 of the diaphragm 14. The ring has lateral projections, flanges or ears 20 and 21 engaging shoulders formed by annular projections 22 and 23 respectively on opposite surfaces of adjacent bucket wheels. The projections 22, 23 prevent the ring from moving outward under the action of centrifugal force exerted thereon. The projections 20, 21 of the packing ring are formed in the process of manufacture of the ring by cutting deep grooves 24, 25 into the outer surface of the ring as shown on the right-hand side in the drawing. These grooves define portions 26 which project radially away from the axis of the ring. The overall width $a$ of the ring thus formed is slightly less than the distance $b$ defined between the projections 22 and 23 of the bucket wheels. This permits the ring, that is, the halves or segments thereof, to be radially inserted in the rotor. After insertion, the portions 26 are deformed, that is, bent sidewise or laterally outward, to grip the inner surfaces or shoulders formed by the projections 23, 22 as indicated with respect to the left-hand ring in the drawing.

With my invention I have accomplished the provision of an improved packing ring for solid type turbine rotors and an improved method of assembling such rings with the rotor. The arrangement is simple and reliable in operation and may be produced at comparatively low cost.

What I claim as new and desire to secure by Letters Patent of the United States is:

In an elastic fluid turbine having a rotor with wheels integrally formed with the shaft and a diaphragm intermediate adjacent wheels, the method of assembling a packing ring intermediate the shaft and a packing surface on the diaphragm, which method comprises inserting a plurality of ring segments having portions projecting radially away from the axis of the rotor, and bending such portions sidewise in the direction of the axis to effect contact between said portions and shoulders formed on opposite surfaces of the wheels.

JOHN H. DORAN.